United States Patent [19]

Muir

[11] Patent Number: 5,383,948

[45] Date of Patent: Jan. 24, 1995

[54] METHOD AND APPARATUS FOR CRACKOFF AND NECK SEALING OF CATHODE RAY TUBE FUNNELS

[75] Inventor: Lance P. Muir, Big Flats, N.Y.

[73] Assignee: Corning Incorporated, Corning, N.Y.

[21] Appl. No.: 85,739

[22] Filed: Jul. 6, 1993

[51] Int. Cl.⁶ .............................................. C03B 29/02
[52] U.S. Cl. .................................... 65/28; 65/42; 65/138; 65/160; 269/329; 269/908
[58] Field of Search ................ 65/28, 29, 42, 138, 65/139, 160; 269/908, 329

[56] References Cited

U.S. PATENT DOCUMENTS

| | | | |
|---|---|---|---|
| 2,923,097 | 2/1960 | Hollinger | 65/28 X |
| 3,034,778 | 5/1962 | Schaffer et al. | 269/908 |
| 4,165,227 | 8/1979 | Nubani et al. | 65/42 |
| 4,335,492 | 6/1982 | Schmidt et al. | 269/908 |
| 4,582,200 | 4/1986 | Sattazahn et al. | 269/908 |
| 4,664,364 | 5/1987 | Lymburner | 269/329 |
| 5,034,621 | 7/1991 | Groves et al. | 269/329 |
| 5,279,493 | 1/1994 | Halder | 269/329 |

*Primary Examiner*—Robert L. Lindsay
*Attorney, Agent, or Firm*—Robert L. Carlson

[57] ABSTRACT

This invention relates to a method and apparatus for cracking off glass attached to, or comprising a portion of, the constricted end (neck) of the glass funnel component of a glass cathode ray tube and thereafter sealing a replacement glass neck component to the funnel component. A gauge and sensor mechanism are used to produce a signal representative of the location of a defined plane through the funnel. This signal is sent to a central processing unit which controls the apparatus so that the cracking off of the old neck and subsequent sealing of the new neck take place at that defined plane. In this way, the individual method steps are integrated into an automated process.

20 Claims, 2 Drawing Sheets

METHOD AND APPARATUS FOR CRACKOFF AND NECK SEALING OF CATHODE RAY TUBE FUNNELS

FIELD OF THE INVENTION

The present invention relates to a method and apparatus used for repairing cathode ray tubes, and more particularly to a method and apparatus for cracking old necks off of and sealing new necks onto funnels of cathode ray tubes.

BACKGROUND OF THE INVENTION

An envelope is the glass portion of a cathode ray tube (CRT), and generally consists of three basic glass sections: a relatively flat face-plate, through which an image is viewed, a conical funnel section to which the faceplate is sealed, and a neck section comprising a length of tubing sealed to the vertex of the funnel and in which the electronic assembly (termed the "gun") for generating the image is sealed. The area where the neck section meets the conical funnel section is commonly known as the yoke, and the angle at which the conical funnel flares out therefrom is known as the yoke angle of the funnel.

During the manufacture of CRTs, after a face-plate has been sealed to the outspread end of the funnel and the neck has been sealed to the constricted end of the funnel to form a complete envelope, the electronic gun is inserted into the neck and sealed thereto. This operation frequently leads to rejects resulting from such defects as cracking, chipping, misalignment, and poor seals. Because of the relatively high costs of envelopes, the CRT manufacturer, in an effort to reduce costs, will commonly remove the seal between the face-plate and the funnel, crack off the portion of the neck having the electronic assembly therewithin, and either repair the funnel in-house or returns the funnel with the remainder of the attached neck to the glass component manufacturer to be repaired. The repair activity removes the old neck and attaches and seals a new replacement neck thereon.

The dimensions and contours of the repaired funnels must continue to satisfy prescribed manufacturer specifications, and thus it is important that the old neck be cracked off and the new neck be attached with precision. This is particularly important for straight ended necks (i.e., cylindrical, as opposed to those having a flared distal end). With flared necks, the electronic gun is typically sealed well inside the distal end of the neck, after which the flared distal end is removed. With straight ended necks, however, the electronic gun is sealed at the very end of the neck. Consequently, when attaching straight ended replacement necks, it is even more important that the distal end of the neck be located accurately.

To further complicate matters, the component manufacturer commonly receives a variety of different size glass funnels, having different sized viewing screens and/or yoke angles, and which have been fabricated by different glass manufacturers and/or at different time periods. As a result, the funnels to be repaired will commonly be in a random sequence of different sizes, all of which require the existing neck to be cracked off and a new neck attached. These circumstances self-evidently make consistent dimensional control extremely difficult and time consuming.

The cross-sectional area of the funnel across which the neck is to be cracked off is commonly known as the crackoff plane. To meet the stringent yoke-to-end-of-neck dimensions required by manufacturers, it is critically important that, before attaching the necks, an extremely precise crackoff plane be defined. Because of the random shape and size encountered from funnel to funnel, it is difficult to consistently obtain such a precise crackoff plane location. In addition, after the crackoff procedure, the replacement neck must be sealed to the funnel at the plane of glass crackoff while still complying with these critical yoke-to-end-of-neck dimensional tolerances.

It is therefore desirable, during these crackoff and resealing operations, to have a consistent gauging point from which to measure and locate the crackoff plane and end of neck location. One such consistent reference point commonly used in the CRT industry is known as the yoke reference line (YRL). The YRL is a manufacturer's specification which exists for any model and size CRT, and for each model and size funnel does not vary. The yoke reference line is a particular diameter which is usually located in the yoke area of the funnel. Currently, to determine the location of the YRL, a donut shaped gauge is manually placed over the neck of the funnel and slid down onto the yoke section until it contacts the desired diameter. Unfortunately, such manual gauging systems lack consistency and accuracy.

Furthermore, after the YRL is located, the crackoff plane location is typically located manually by measuring a predetermined distance from the YRL. This second manual measurement adds further margin for error and inconsistency into the neck resealing process.

After the crackoff plane has been located, the funnel is moved to a scoring apparatus to score the old neck at the crackoff plane. This is typically done by bringing a rotating glass scoring device into contact with the inside diameter of the funnel, and scoring the funnel at the predetermined crackoff location. The location of the scoring device is again done manually.

After scoring the glass, the scoring device is withdrawn from the funnel and the funnel is manually placed near a burner system so that the flames of the burner contact the funnel at the scored crackoff location. These flames cause the glass to break from the scored surface completely through the thickness of the glass. The unwanted glass (commonly known as "moil") then is typically allowed to fall away by gravity.

A replacement neck must then be sealed to the cracked off funnel. This is typically achieved by manually aligning the funnel with a replacement neck and then manually controlling a suitable mechanical apparatus to bring the neck in contact with the crackoff surface of the funnel, while a flame from a burner heats the joining area of the two components. Once the sealing process has been completed, the funnel is removed and allowed to cool. The funnel is then commonly annealed to complete repair of the funnel.

As is evident from the above description, the current practice is time consuming, and the manual gauging, measuring, and apparatus control methods are relatively inconsistent and inaccurate and require a skilled operator to be successfully completed.

Thus, the need remains for a more efficient method and apparatus for carrying out the process of cracking off the necks of damaged funnels at a precisely calculated point, and thereafter sealing a replacement neck to the funnel at the crackoff plane. There is a particular need for such a method and device which are capable of quickly and easily performing these operations on a variety of different funnel designs, having different sized viewing screens and different shaped yoke angles. Because of the intermittent nature of such repairs, it is also desirable that the process be operable using relatively unskilled labor.

BRIEF SUMMARY OF THE INVENTION

One aspect of the present invention relates to an apparatus for attaching a glass neck to a glass funnel for a cathode ray tube, comprising:
 a frame;
 a support platform attached to said frame for supporting a glass funnel component;
 a gauge attached to said frame for determining a reference location on said funnel component, at least one of said support platform or said gauge being movable toward the other;
 a sensor for providing a signal when a funnel is appropriately positioned in said gauge; and
 a system controller for receiving said signal and using said signal to control movement of at least one moving part on said apparatus.

Another aspect of the present invention relates to an apparatus for repairing cathode ray tubes, comprising:
 a frame;
 a support platform attached to said frame for supporting a glass funnel component;
 a gauging means attached to said frame for determining a reference location on said funnel component, at least one of said gauging means or said support platform being movable toward the other, said gauging means providing a signal representative of said location;
 crackoff means for cracking off and funnel at said defined plane; and
 control means for receiving said signal and using said signal to control movement of at least one moving part on said apparatus lowering.

Another aspect of the present invention involves utilizing one of the above described apparatus in conjunction with one or more of the following devices: a scoring mechanism; a crackoff burner; a replacement neck supporting device; and a neck sealing burner; wherein the movement of one or more of the devices on the apparatus is controlled using the control means.

Another aspect of the present invention involves a method for cracking off a portion of the neck of a glass funnel component of a glass cathode ray tube at a specifically defined plane and thereafter sealing a replacement glass neck component to said funnel component at said defined plane comprising:
 determining the location of a reference plane; and
 cracking off the constricted end of said glass from said funnel component at a crackoff plane;
 said cracking off step being controlled by a system controller using information from said determining step.

One aspect of the determining step involves contacting the funnel component with a gauge and sensing movement of the gauge with a sensor, said sensor producing a signal when said movement occurs. The system controller uses the signal to determine the location of said crackoff plane.

In one embodiment, the cracking off step involves scoring said funnel at said crackoff plane, after which a heat source is applied at the crackoff plane of said funnel.

Another aspect of the invention involves sealing a replacement neck component to said glass funnel component at said defined plane, the sealing step being controlled by the computer control system using information from the determination of the location of said reference plane.

The method and apparatus encompassed by the above-described aspects of the invention have numerous advantages over the prior art methods and apparatus. Several advantages are provided by the present invention's utilization of a gauge and sensor combination to measure the vertical position of a reference plane, such as the yoke reference line, and using this position to determine an optimum position for scoring and cracking off of the neck.

First, by utilizing an electronic sensor and gauge combination to locate the crackoff plane, the human error inherent in manual gauging methods is eliminated, thus enabling accurate attachment of the replacement neck.

Second, by accurately locating the position of a reference plane for a particular funnel and inputting this location into a computer programmable logic controller, the entire crackoff and sealing operation can be automated using suitable drive systems to drive the movement of one or more components on the apparatus. Such automation greatly increases both the speed at which funnels are repaired and the resulting overall quality of the funnel.

Third, the ability to repair a variety of different shaped and sizes of funnels is facilitated, since parameters for such different shapes and sizes can be stored in the computer and called up as desired.

Fourth, the attachment of non-typical replacement necks is greatly facilitated, as such necks can be attached by entering into the computer the dimensions and parameters necessary to carry out successful attachment.

GENERAL DESCRIPTION OF THE INVENTION

Figure 1:
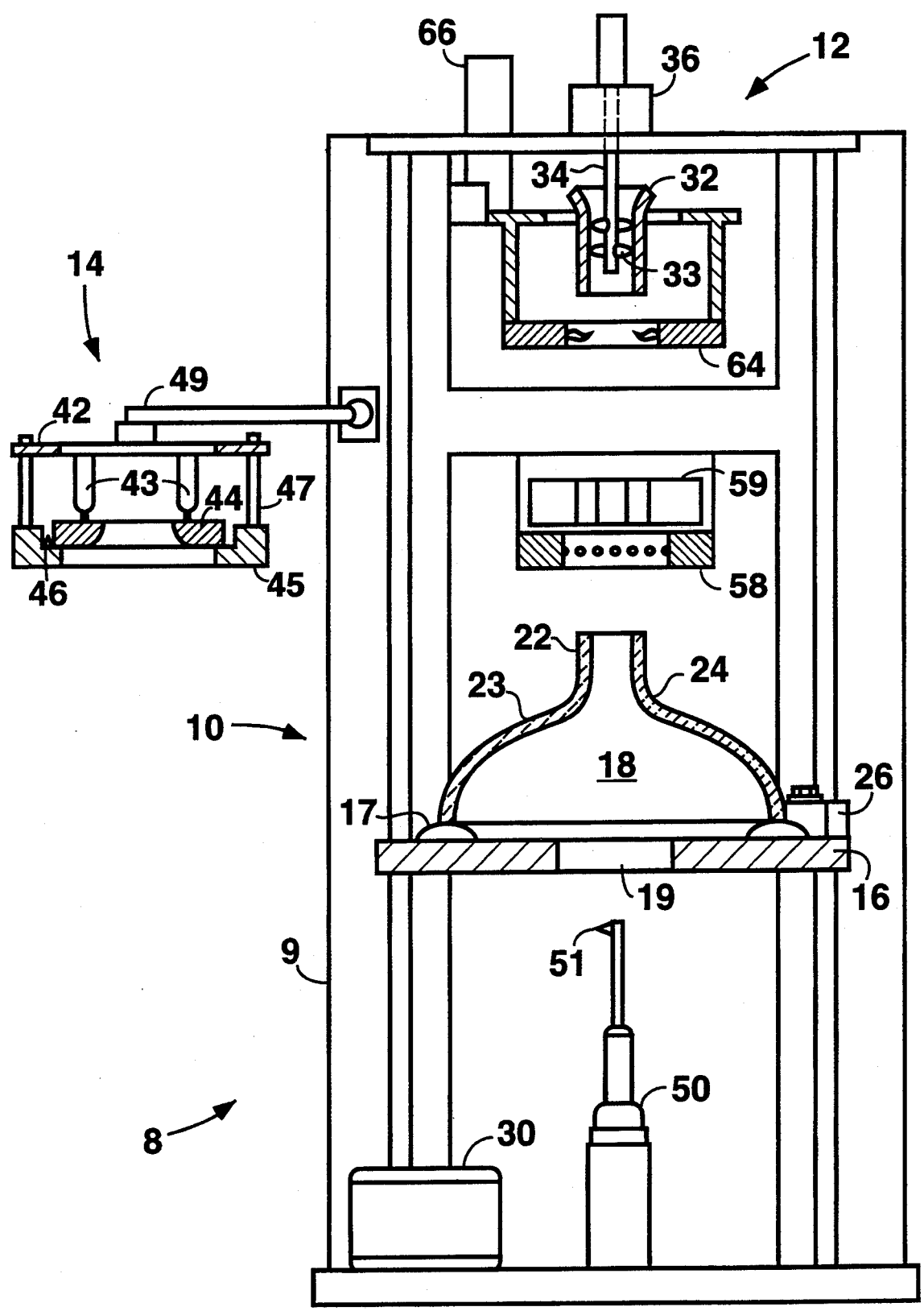
FIG. 1 is a front cross-sectional view of a crackoff and neck sealing apparatus in accordance with the present invention.

FIG. 1 is a front view of a preferred embodiment of the crackoff and neck sealing apparatus 8 in accordance with the present invention.

Crackoff and neck sealing apparatus 8 is defined by main frame 9, funnel support section 10, replacement neck support section 12, and gauging section 14.

Figure 2:
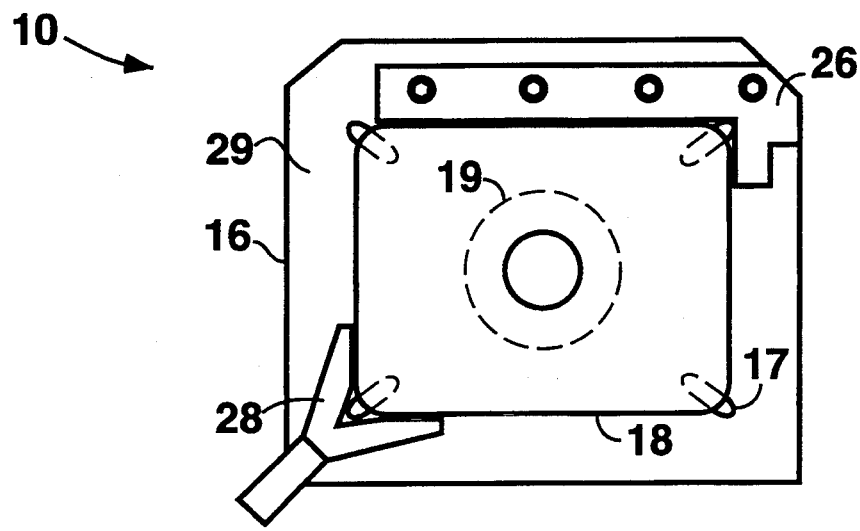
FIG. 2 is a top view of a support platform for holding a CRT funnel in place during the crackoff and sealing processes.

As best illustrated in FIGS. 1 and 2, funnel support section 10 includes a support platform 16 having a plurality of cushions 17 thereon for supporting the outer edges of the faceplate end of funnel 18 (commonly called the "seal edges"). Support platform 16 is provided with an aperture 19 through which scoring devices may be inserted to score funnel 18, as will be described further hereinbelow. The CRT funnel 18 to be repaired typically has a neck section 22 and a conical component 23. The area of the funnel where neck 22 meets conical component 23 is known as the yoke 24.

As best illustrated in FIG. 2, funnel 18 is securely clamped to support platform 16 between locating fixture 26 and positioning clamp 28, both of which are attached to upper surface 29 of support platform 16. In operation, a funnel 18 is provided which has had its faceplate and the electronic gun portion of its neck removed. This funnel is placed, faceplate end down, so the peripheral edge of funnel 18 is resting on cushions 17. One side of funnel 18 is located against locating fixture 26, and positioning clamp 28 is tightened against the opposite side of funnel 18, thereby securely fastening funnel 18 to support table 16.

In a preferred embodiment, support platform 16 is capable of being raised or lowered along main frame 9 to enable transportation of funnel 18 to various operations. Movement of support platform 16 may be accomplished using a variety of methods, such as, for example, via drive assembly 30. Drive assembly 30, which is supported on main frame 9, drives support platform 16 upwardly or downwardly. Drive assembly 30, as well as any of the other drive assemblies discussed herein, may be, for example, electronic, pneumatic, or hydraulic, or any other suitable drive mechanism, which may vary depending on design preferences.

It is, of course, not critical that the funnel be supported by a platform, as any means which adequately supports the funnel will suffice. For example, one suitable alternative funnel support method, which, like support platform 16, is merely illustrative and not inclusive, is a tong-like device (not shown) which grips the outer periphery of the funnel at some point. To enable a complete crack-off and resealing operation using a single apparatus, crackoff apparatus 8 is preferably provided with a replacement neck support section 12 for carrying replacement neck 32. In the illustrated figures, replacement neck 32 has a flare ended neck. However, other necks, such as straight ended necks, can be utilized as well, and in fact the present invention is especially useful in precisely attaching straight ended necks. Replacement neck support section 12 includes neck chuck 34 for securely retaining and locating replacement neck 32 in proper orientation for subsequent attachment to funnel 18. The neck chuck 34 illustrated is an internal chuck, i.e., it grips the internal surface of replacement neck 32. It does so by a plurality of outwardly extending gripping members 33, which can be actuated to exert an outward force on the inside diameter of neck 32. However, the type of neck chuck utilized is not critical, and thus the neck chuck may be an internal chuck, as illustrated, or alternatively an external chuck or other suitable supporting device. Preferably, neck chuck 34 is capable of being raised or lowered. This may be achieved using any conventional method, such as, for example, by drive assembly 36, which may be similar to drive assembly 30, described above.

Figure 4:
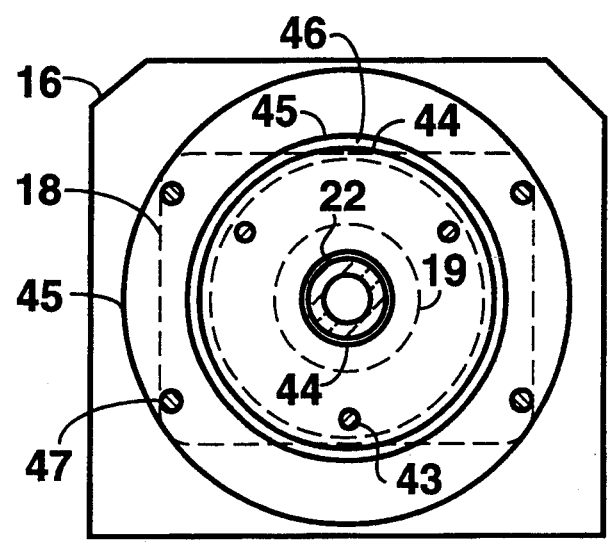
FIG. 4 is a top view of a gauging block in gauging position in accordance with the present invention.
Figure 3:
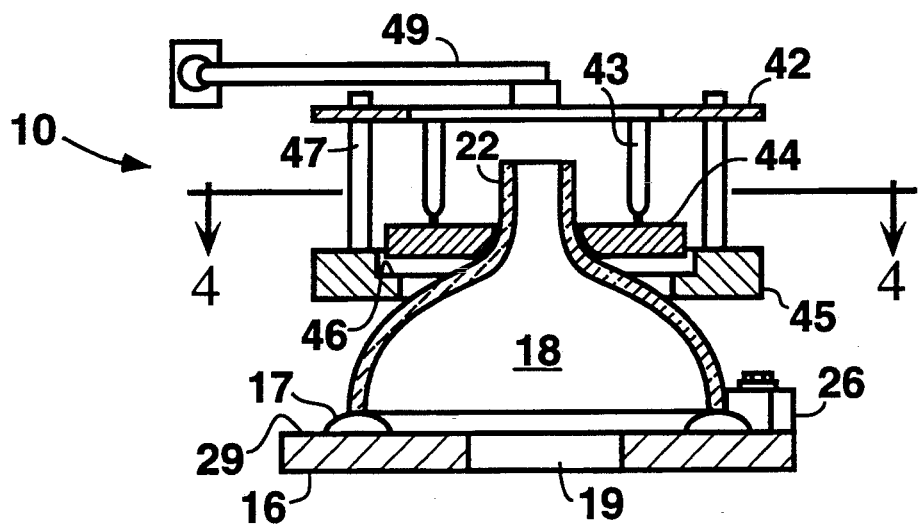
FIG. 3 is a side cross-sectional view of a gauging position with a CRT funnel in accordance with the present invention.

As best illustrated in FIGS. 1, 3, and 4 sensor and gauging section 14 includes gauge carriage 42, electronic sensors 43, gauge block 44, and gauge support ring 45. Gauge support ring 45 is a donut shaped member having an inner recessed surface 46 on which gauge block 44 rests. The outer periphery of gauge block 44 is smaller than the inner periphery of recess 46 of gauge support 45, so that gauge block 44 rests loosely on recessed surface 46 of gauge support 45. Gauge support 45 is connected to the bottom surface of gauge carriage 42 by a plurality of connecting rods 47. Three electronic sensors 43 are rigidly attached to the undersurface of gauge carriage 42, the sensor portion of these devices being located so that they detect upward movement of the upper surface of gauge block 44. Sensors 43 can be, for example, low voltage displacement sensors.

Gauge block 44 is donut shaped and has an inner diameter gauging surface corresponding to the diameter of the reference line of the particular funnel it is designed to gauge. The location chosen as the reference planes may be, for example, the yoke reference line. The cross-sectional inner radius of gauge block 44 is preferably smaller than that of the yoke of the particular funnel being measured to facilitate gauging of the funnel at the correct location on the gauge.

Gauge carriage 42 is preferably pivotally attached to main frame 9, such as via swing armature 49, so that the entire gauging section 14 may be swung into operative position within the main frame 9 over the funnel, as illustrated in FIG. 3, and afterwards, moved to an inoperative position outside main frame 9, as illustrated in FIG. 1.

To locate the reference plane on a funnel having a particular size and shape, the appropriate gauge block 44 for locating the reference plane on the particular funnel being repaired is placed inside recess 46 of gauge support 45. Sensor and gauging section 14 is then swung, as illustrated in FIG. 1, into gauging position via swing armature 49, after which gauge 44 is lowered or support table 16 is raised, so that neck 22 of funnel 20 intersects the open center of gauge 44, as illustrated in FIGS. 3 and 4, until the gauge meets a diameter of the funnel equal to the inside diameter of the gauge. When the gauge is properly located against funnel 18, sensors 43 send a signal to a system controller (not shown), the signal being representative of the location of the gauge contacting surface of the funnel. This position on the funnel is then used as a reference plane to control movement of apparatus 8. The reference plane may be the YRL, described above, in which case the gauge will have been designed with an inside diameter equal to diameter of the YRL for that particular shape, size, and design of funnel. In a manufacturing operation, it might be necessary to have a variety of gauges available, each one being suitable for one or more particular funnel designs, shape, and sizes. Ideally, however, each gauge would be suitable for as many different designs and sizes of funnels as possible. Alternatively, it is conceivable that a variable size gauge could be employed, the inside radius of which could be accurately varied, such as by electronic or other suitable means.

A particularly significant attribute of the system of the present invention is its flexibility in repairing glass funnels of a wide range of designs and sizes. Such operational flexibility is facilitated by providing the system of the present invention with the system controller (not shown) to operate the moving components, which may include, for example, support table 16, gauging section 14, neck chuck 34, and so forth to achieve the repair of a particular funnel. Such a controller is conventionally in the form of a computer, central processing unit, or microprocessor such as a programmable logic controller having various production operating programs stored in its memory. An example of a suitable programmable logic controller is an Allen-Bradley PLC Model 500, manufactured by Allen-Bradley. To facilitate operational control by such a system, the components of the system of the present invention (i.e., support table 16, gauging section 14, neck chuck 34, and so forth) are linked to the computer by control lines according to techniques well known in the art. Additionally or alternatively, the system controller can be connected to a number of independent electronic control boxes, each of which serves as the immediate controller for each of the motor assemblies which drive the moving components.

A keypad or keyboard (not shown) is typically connected to the computer for inputting information or instructions to the computer. The keyboard may be a conventional computer keyboard, or alternatively, may have only the number of keys needed to perform the necessary communications for the particular design of crackoff apparatus 8 being used. The particular keyboard configuration may of course also vary depending on the functions desired by the designer.

In a preferred control technique, an x, y, and z axis is assigned on apparatus 8 for directional control by the computer. For purposes of explanation herein, the vertical axis through apparatus 8 is the z axis. Preferably, apparatus 8 is designed so that the axis of funnel 18 to be repaired, gauge block 44, and replacement funnel 32 are located in axial alignment along the z axis. Once the location of the funnel crackoff plane has been located on the z axis, suitable computer programs are implemented which use information about this location to accurately manipulate the various moving parts of apparatus 8 to effect a successful crackoff operation. Preferably, this is done using feedforward techniques. For example, in a preferred embodiment, each of the moving components of apparatus 8 are driven by a motor and drive mechanism, such as, for example, an electronic motor connected to a drive screw. The drive screw attaches to its respective moving component and moves it according to directions from the system controller.

For example, the following sequence of operations illustrates a preferred embodiment of the invention. An appropriate gauge is first placed into recess 46 of gauge support 45. The gauge has an inner gauging surface diameter which corresponds to the outside diameter of the desired reference plane of the funnel being repaired (this reference plane may, if desired, be the yoke reference line). The location, on the z axis, of this inner gauging surface diameter (when gauging section 14 is in gauging position) is either stored or entered into the computer. Also stored in the computer is the distance, on the z axis, from the gauging surface diameter to the desired crackoff plane for that particular funnel. Gauging section 14 is moved into gauging position, as illustrated in FIG. 3, and drive assembly 30 is activated to raise funnel support table 16 upwardly until funnel 20 engages the gauging surface of gauge 44. Electronic sensors 43 sense when funnel 20 contacts gauge 44, and the sensors 43 send a signal telling the computer that contact has been made. The computer can then calculate the position of the crackoff plane by adding or subtracting the appropriate distance.

Once the z-axis location of the crackoff plane has been established, the computer control system implements one or more programs stored therein which control movement of the various components of apparatus 8 to effect a successful crackoff and resealing operation. It does so by initiating control programs within the computer which control each of the motors which drive the various moving components. For example, in one embodiment, support platform 16 is moved upwardly and/or downwardly along the z axis as required, i.e., so that the crackoff plane of funnel 18 moves first to scoring mechanism 51, then to crackoff burner 58, then to resealing burner 64, and so forth. Other programs in the computer can then be implemented to control the scoring device, crackoff burner, and so forth to accurately carry out the crackoff and/or sealing procedures desired. There are a variety of methods which can be used to control the moving components of apparatus 8. How one chooses to use the conventional analytical techniques, computer programs, and geometric relationships is largely a matter of design choice. As mentioned above, the z-axis location of the gauging surface of the particular gauge being used may first have to be entered into the computer control means. Alternatively, apparatus 8 and each of the gauges used may be designed so that for each gauge the z-axis location of the YRL or other reference plane on the gauging surface is a constant.

In some circumstances, the gauge may not be level as it contacts the yoke, perhaps because the funnel is warped slightly in the yoke region or mounted slightly off center from gauge 44. Ordinarily, this could create a problem in locating the yoke reference line. However, in a preferred embodiment of the present invention, a simple computer program is provided and stored in the computer which takes an average of the three locations sensed by the three sensors 43. This average will necessarily be between the highest and lowest points of contact, and utilization of this average has produced extremely accurate results in the preparation of funnels.

After the vertical position of the yoke reference line has been established, drive 30 lowers support platform 16 and funnel 20 from gauging section 14, and gauging section 14 is swung via armature 49 to an inoperative position, as illustrated in FIG. 1.

After the computer has calculated the location of the desired crackoff plane, drive assembly 30 lowers support platform 16 so that the scoring mechanism and the support table are at an appropriate location to enable carbide cutter 51 to score the inside surface of the funnel at the preestablished crackoff plane. Scoring mechanism 50 may be any conventional scoring mechanism, such as, for example, carbide wheel 51 or any other scoring mechanism, together with a means for providing a force, in the direction of the glass surface to be scored, sufficient to cause the carbide wheel to score the glass surface.

Crackoff burner 58, which may be either rigidly or movably mounted on to main frame 9, is then moved into position adjacent the scored crackoff plane, by either moving crackoff burner 58 down or support platform 16 up an appropriate distance so that the crackoff burner 58 is directly opposite the now scored crackoff plane. In the embodiment illustrated, crackoff burner 58 is rigidly attached to main support frame 9, and support table 16 is moved up to adequately position the funnel with respect to the crackoff burner. Crackoff burner may be any type of suitable burner mechanism, such as, for example, a split ring type. After the burner is ignited, the flames impact onto the scored area of the glass an amount of heat sufficient to cause the scored surface to crack entirely through the thickness of the glass. The remainder of the glass neck, which is commonly known as moil, is then typically collected and recycled as cullet.

During the moil collection operation, any downward force imparted from the moil against the breakage surface of the funnel may scratch the breakage surface of the funnel. This scratching of the funnel by the moil can lead to the production of small bubbles in the area where the neck 32 is joined to funnel 18, a defect which is commonly known as reboil.

Consequently, to prevent scratching of the funnel by the moil during the crackoff operation, the moil is preferably lifted upwardly (along the z direction after crack-off) utilizing a pair of tong-like moil pick-off fingers 59, which are also attached to main frame 9. In operation, pick-off fingers 59 move into position prior to crack-off of the neck to grip the moil. After crack-off, the pick-off fingers 59, still clamping onto the now cracked-off moil, are moved upwardly along the z-axis and away from the funnel (alternatively the support table could be moved downwardly) to prevent scratching of the funnel by the moil. The moil can then be removed and recycled as cullet.

Support table 16 is then moved upwardly via drive assembly 30 until the crack off plane of the funnel is adjacent sealing burner 64, which assembly is driven by burner drive assembly 66. To effectuate sealing of the new neck to the cracked off funnel, neck chuck 34 is moved downwardly by drive assembly 36 (and/or support table is moved upwardly) so that both the upper surface of the funnel and the lower surface of replacement neck 32 is situated in the area of the sealing burner 64. Soft preheat fires are first ignited in sealing burner 64 to prevent thermally induced cracking of the funnel or neck. Hard sealing fires are then ignited in burner 64 to soften replacement neck 32 and the cracked off surface of funnel 20. Sealing burner 64 may be any suitable burner, such as, for example, a rotating type. A rotating burner consists of a plurality of gas burner nozzles distributed in a circular ring around the outer periphery of the neck, each burner nozzle being pointed towards the neck area to be sealed. During the sealing operation the burner rotates around the neck to more equally distribute the heat from the burner nozzles.

Once both glass surfaces are sufficiently heated, neck chuck 43 is moved downwardly to lower replacement neck 32 onto funnel 20 and into a sealing position therewith. In a preferred embodiment of the invention, during the sealing operation the replacement neck is pulled away from the funnel slightly to prevent build-up of molten glass in the area where the replacement neck meets the funnel. Such an operation, commonly known as a squash and pull type neck sealing method, may also be controlled using a suitable computer numerical control program. The amount of pull-back may vary depending on the particular combination of funnel and replacement neck being attached.

After sealing is complete, the sealing fires are extinguished and the seal permitted to cool. Replacement neck 32 is then released from neck chuck 34 and neck chuck 34 is retracted upwardly to its original location by drive assembly 36. Support table 16 is then returned to its original position via drive assembly 30, ware positioning clamp 28 is released, and funnel 20, with replacement neck 32 now securely sealed thereto, is removed from support platform 16. The repaired funnel may then be annealed if desired.

A subsequent funnel and replacement neck are then inserted into the apparatus, and the above described process repeated. Ideally, funnels of the same design, shape, and size are run consecutively, after which other shapes, sizes, etc. are repaired. Of course, when changing from one design or size funnel to another, it may be necessary to change gauge blocks (if the diameter of the reference line changes) or enter a new reference line to crack-off plane distance, and so forth.

Replacement necks having other than conventional lengths and diameters can easily be utilized with any particular funnel, if desired, by entering into the computer the corresponding dimensions, distance from YRL to crack-off plane, etc., to enable the computer to control attachment of a particular neck to a particular funnel.

The invention has been described in detail with particular reference to preferred embodiments thereof, but it will be understood that variations and modifications can be effected within the spirit and scope of the invention. For example, although as described, the invention utilizes a movable funnel support platform which moves to the different scoring, crack-off, sealing, and other operations, the support platform could be rigidly attached to the support frame and each of the operations (scoring, crack-off flame, sealing, etc.) could be moved to the stationary funnel. Also, it should be noted that, while the examples discussed herein utilize a mechanical gauge and electronic sensor, it is certainly conceivable that a laser gauging system could be substituted therefore. For example, the laser could be used to locate the desired diameter by appropriately reflecting and sensing the laser off of the outside surface of the funnel. In such cases the gauging means could be fixedly (rather than rotatably) connected to apparatus 8. It should further be noted that the alternatives illustrated and mentioned for various components, such as, for example, gauging means, support platforms, scoring devices, drive assemblies and burners are merely illustrative and not inclusive.

What is claimed is:

1. An apparatus for attaching a glass neck to a glass funnel of a cathode ray tube, comprising:
   a frame;
   a support platform attached to said frame for supporting a glass funnel component;
   a gauge attached to said frame for determining a reference location on said funnel component, at least one of said gauge or said support platform being movable toward the other;
   a chuck attached to said frame for supporting a glass neck component,
   a sensor for providing a signal when a funnel is appropriately positioned in said gauge; and
   a system controller for receiving said signal and using said signal to control movement of said apparatus to effectively attach sale glass neck component to said glass funnel.

2. The apparatus of claim 1, further comprising at least one drive assembly attached to said frame for raising or lowering at least one of said gauge or said support platform, and said system controller controls said drive assembly.

3. The apparatus of claim 1, wherein said system controller includes a stored program responsive to said signal.

4. The apparatus of claim 1, whereby said system controller determines the location of a defined plane through said funnel at which a replacement neck will be attached.

5. The apparatus of claim 4, wherein said support platform is attached to said frame below said gauge, and one of said platform or said gauge are movable toward one another to determine said defined plane.

6. The apparatus of claim 5, further comprising at least one burner attached to said frame for cracking off the neck end of said funnel component at said defined plane after said scoring.

7. The apparatus of claim 4, further comprising at least one burner attached to said frame for sealing together said replacement glass neck component and said glass funnel component at said defined plane after crackoff of the neck portion of said funnel.

8. The apparatus of claim 1, further comprising a chuck attached to said frame for supporting a replacement glass neck component, at least one of said platform and said chuck being movable along a path towards and away from the other.

9. The apparatus of claim 1, wherein said gauge is pivotally attached to said frame.

10. The apparatus of claim 1, wherein said sensor comprises a low voltage displacement sensor.

11. An apparatus for repairing cathode ray tube funnels, comprising:
a frame;
a support means attached to said frame for supporting a glass funnel component having an existing neck section attached thereto;
a gauging means attached to said frame for determining a reference location on said funnel component, at least one of said gauging means or said support platform being movable toward the other, said gauging means providing a signal representative of said location;
crackoff means for cracking off said existing neck section of said funnel at a defined plane;
a chuck attached to said frame for supporting a new glass neck component,
at least one burner means for heating said neck component and funnel to connect said new neck component to said funnel, and
control means for receiving said signal and using said signal to move said gauging means toward said support means to gauge said funnel, moving said funnel to said crackoff means to crackoff the existing neck section of said funnel, and cooperatively moving said chuck and said support means to attach said glass neck component to said glass funnel.

12. The apparatus of claim 11, wherein said crackoff means comprises scoring means for scoring said funnel component at said defined plane.

13. The apparatus of claim 11, wherein said control means uses said signal to locate said defined plane.

14. The apparatus of claim 11, wherein said gauging means comprises a laser.

15. A method for cracking off a portion of the neck of a glass funnel component of a glass cathode ray tube at a specifically defined plane and thereafter sealing a replacement neck component to said funnel component comprising:
providing a frame, and a support means attached to said frame for supporting a glass funnel component having an existing neck section;
providing a gauging means attached to said frame for determining a reference location on said funnel component;
providing a crackoff means on said frame for cracking off said existing neck section;
providing a chuck attached to said frame for supporting a replacement glass neck component;
providing at least one burner means attached to said frame for attaching said replacement glass neck component to said glass funnel;
determining the location of a crackoff plane said determining step comprising moving one of said gauge means or said support means toward one another to gauge said funnel to determine the location of a reference plane;
controlling movement of said apparatus using a system controller, said system controller using said location information to:
move said funnel to said crackoff means to crackoff said existing neck section at a crackoff plane;
move said support means and said chuck to position said reference plane and said neck component adjacent said burner means; and then
activate said burner means to heat and join said replacement neck component to said funnel at said crackoff plane.

16. The method of claim 15, wherein said reference plane is the same as said crackoff plane.

17. The method of claim 15, wherein said reference plane is utilized to determine said crackoff plane.

18. The method of claim 15, wherein said gauging comprises utilization of a laser.

19. The method according to claim 15, wherein said determining step comprises:
contacting said funnel component with a gauge; and
sensing movement of said gauge with a sensor, said sensor producing a signal when said movement occurs;
and said system controller uses said signal to determine the location of said crackoff plane.

20. The method of claim 15, wherein said determining step comprises utilizing an electronic sensor, a gauge, and a computer cooperatively.

* * * * *